Dec. 1, 1959     L. KRAUS     2,915,133

VEHICLE HAVING FOUR-WHEEL DRIVE WITH OFFSET FLYWHEEL

Filed July 5, 1955

INVENTOR

LUDWIG KRAUS

BY *Dicke and Craig.*

ATTORNEYS

United States Patent Office 2,915,133
Patented Dec. 1, 1959

2,915,133

VEHICLE HAVING FOUR-WHEEL DRIVE WITH OFFSET FLYWHEEL

Ludwig Kraus, Stuttgart-Rotenberg, Germany, assignor to Daimler-Benz Aktiengesellschaft, Stuttgart-Unterturkheim, Germany Application July 5, 1955, Serial No. 520,036

Claims priority, application Germany July 2, 1954

11 Claims. (Cl. 180—44)

The present invention relates to automobiles, and more particularly to sport and race cars and the means for driving the same.

It is a primary object of the present invention to produce an automobile in which the center of gravity is disposed at the lowest possible point, and wherein especially the driving engine is mounted at the lowest position possible.

Another object of the present invention consists in an automobile in which the available space is most suitably used for distributing the essential elements and wherein the weight is distributed as uniformly as possible.

A preferred feature of the invention consists in mounting the flywheel, the drive shaft which connects the engine with the wheels of the car, or the clutch so as to be disposed eccentrically relative to the crankshaft of the engine.

Another feature of the invention consists in arranging the axis of the flywheel or the clutch, preferably together with the connecting shaft which drives, for example, the rear transmission, so as to be disposed preferably so much higher from the ground than the crankshaft of the engine that the distance between the flywheel or the clutch or their housing and the ground will be substantially equal to the distance between the engine and the ground. By such a disposal it is possible to reduce the distance of the crankshaft from the ground independently of the diameter of the flywheel or the clutch shaft, and thus to lower the total center of gravity of the engine considerably. Furthermore, according to the invention, the engine is preferably provided with horizontal or angularly disposed cylinders whereby the center of gravity will be still further lowered.

Another feature of the invention resides in mounting the engine which is preferably located in front of the car, or the flywheel or the flywheel housing, as well as the transmission unit which is preferably located at the rear of the car, so as to be of a very low design and disposed at the least possible distance from the ground, that is, for example, at a height of one-sixth of the diameter of the wheels and no higher than one-fourth thereof.

A further feature of the invention consists in providing the drive shaft, which connects the engine with a gear transmission at a point remote therefrom so as to extend from the front toward the rear within a plane outside of the central longitudinal plane of the car and adjacent to the low driver's seat, thus permitting the latter to be placed as low as the bottom wall of the car. Furthermore, the drive shaft connecting the engine with the transmission preferably extends laterally of the rear differential and below and past the rear axle to the transmission which is mounted behind the rear differential. Such arrangement permits the drive shaft to be mounted at such a low level as to extend even below a brake drum which is mounted on the rear axle.

In the event that the car be provided with a four-wheel drive, it constitutes another feature of the invention that a drive shaft, and particularly that shaft which drives the wheels which are nearest the engine, may be driven directly by the crankshaft or by a shaft which is disposed within the central longitudinal plane of the car, or that such first shaft may form an extension of the latter shafts. The other drive shaft, and particularly the one which drives the more remote wheels and carry the flywheel or the clutch, may then be offset relative to the crankshaft and be disposed upwardly and laterally of the crankshaft.

Further objects, features, and advantages of the present invention will be apparent from the following detailed description thereof, as well as from the accompanying drawings which diagrammatically illustrate two preferred embodiments of the invention and in which—

Fig. 3 shows a front view of the engine together with a part of the front-wheel suspension; while

Figure 1:
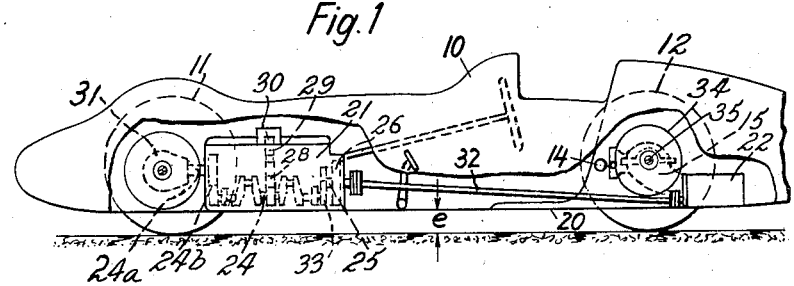
Fig. 1 shows a side view of a sport or race car according to the invention partially in cross section.
Figure 2:
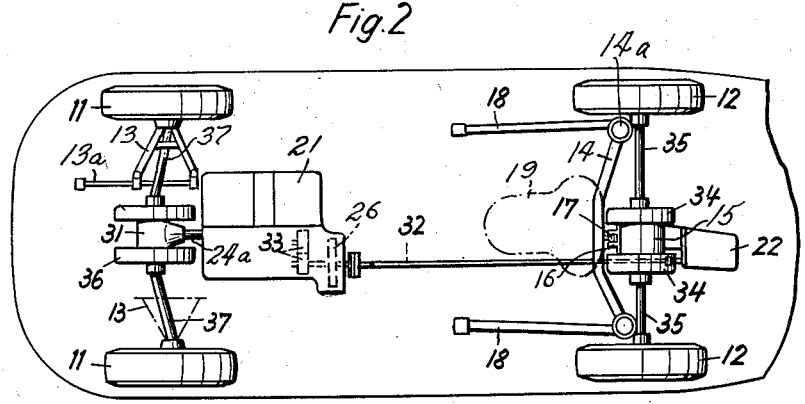
Fig. 2 shows a plan view thereof.

Referring to the drawings, the front wheels 11 and the rear wheels 12 are suspended on the superstructure 10 of the car. Front wheels 11 may, for example, be suspended independently of each other by two superimposed guiding links 13 so as to be parallel or substantially parallel to each other, while the rear wheels 12 are mounted on a rigid axle 14 which is guided by means of a roller 17 in a guide member 16 on the rear differential housing 15, and are supported on the superstructure 10 by bracing members 18 which extend substantially in the longitudinal direction of the car. The spring suspension of the wheels may be of any suitable type consisting, for example, of coil springs, torsion rods, or the like.

Figure 3:
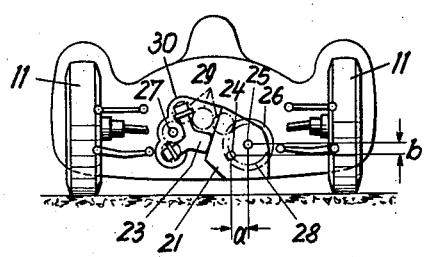

The driver's seat 19 is mounted at the lowest possible point substantially symmetrically to the central longiturdinal plane of the car and directly above the lower bottom or cover plate 20 of the body 10. The front engine 21 and the transmission 22 mounted in the rear of the car are likewise disposed so that their distance from the ground will be equal to that of the lower covering 20. Engine 21 is designed so as to be disposed substantially horizontally with slightly inclined cylinders 23, and with crankshaft 24 of the engine 21 being disposed at such a low point as the cranks thereof will reasonably permit. For this purpose, flywheel shaft 25 is laterally offset relative to crankshaft 24 by a distance $a$, as shown in Fig. 3, and in a vertical direction relative to crankshaft 24 by a distance $b$, so that flywheel 26 with or without a clutch, which may be enclosed by a housing, will be disposed substantially at the same distance from the ground as the engine 21 and the rear transmission 22. The overhead valve control shaft 27 is driven by a gear 28 which may be mounted, for example, on the flywheel shaft and is in engagement with a gear on the valve control shaft 27 through intermediate gears 29 as shown in Figure 3. If desired, a removable cover 30 may be provided over the gear assembly.

Both the front and rear wheels are driven by the engine. The front differential 31 may preferably be driven by a shaft 24a which is disposed within the central longitudinal plane of the car and parallel to crankshaft 24, and which is driven by crankshaft 24, for example, through gears 24b. Speed transmission 22, on the other hand, is driven by the shaft 32 which lies substantially within the same vertical longitudinal plane of flywheel shaft 25 and forms an extension thereof.

Crankshaft 24 and flywheel shaft 25 are interconnected by a set of gears 33. The rear differential 15 is driven by the speed transmission 22 in a manner similar to that disclosed in my co-pending application Serial No. 520,006. The shaft 32 is disposed at such a low position that it may pass underneath one of the brake drums 34 which are mounted at both sides of the rear differential 15. The distance between the ground and the lower bottom covering 20 including the engine 21 and the rear transmission 22 may thus be reduced up to a distance e which approximately corresponds to one-sixth of the diameter of the wheels.

For driving both the front and rear wheels cardan shafts 35 and 37 are used, while brake drums 36 similar to those for the rear wheels 12 may also be provided for the front wheels 11 at both sides of the differential 31.

Figure 4:
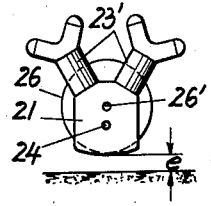
Fig. 4 shows the invention as applied to a V-shaped engine.

Fig. 4 illustrates a modification of the invention with a V-shaped engine 23', in which the flywheel shaft 26' is offset relative to the axis of the crankshaft 24. The distance e of the engine 21 from the ground has thus been reduced to a minimum independently of the flywheel 26 so that both the flywheel 26 and the engine housing 21 may be equally spaced from the ground.

Although my invention has been illustrated and described with reference to the preferred embodiments thereof, I wish to have it understood that it is in no way limited to the details of such embodiments or to the specific examples described, but is capable of numerous modifications within the scope of the appended claims.

Having thus fully disclosed my invention, what I claim is:

1. In a motor vehicle having a pair of front wheels, a pair of rear wheels, a driving engine including a crankshaft and a crankcase, a flywheel for said engine and having a radius larger than the distance between the axis of said crankshaft and the bottom of said crankcase, the axis of said flywheel being disposed above the bottom of said crankcase by a distance equal to at least the radius of said flywheel, means including said flywheel for driving at least one of said pair of wheels by said crankshaft, the axis of said crankshaft being disposed below the axes of said wheels and the axis of said flywheel.

2. In a motor vehicle, the combination as defined in claim 1, wherein the bottom of said crankcase and the lower extremities of said flywheel are spaced from the ground a distance equal to less than one-fourth of the diameter of said wheels.

3. In a motor vehicle, the combination as defined in claim 1, further comprising means for also driving the other pair of said wheels.

4. In a motor vehicle having two pairs of wheels including front and rear wheels, a driving engine mounted adjacent one pair of said wheels and having a crankshaft, said crankshaft being disposed below the axes of said wheels, a flywheel having an axis disposed above said crankshaft but likewise below said wheel axes, means for driving said flywheel by said crankshaft, a drive shaft forming an extension of the axis of said flywheel and disposed below said wheel axes for driving the pair of said wheels more remote from said engine, a second drive shaft for driving the pair of said wheels adjacent said engine and disposed substantially at the level of said wheel axes, and means for driving said second drive shaft by said crankshaft.

5. In a motor vehicle having two pairs of wheels including front and rear wheels, a driving engine mounted adjacent one pair of said wheels and having a crankshaft, said crankshaft being disposed below the axes of said wheels, a drive shaft extending at a level below said wheel axes for driving the pair of said wheels more remote from said engine, the driven end of said drive shaft being disposed above said crankshaft, means for driving said drive shaft by said crankshaft, a second drive shaft for driving the pair of wheels adjacent said engine and disposed substantially at the level of said wheel axes, and means for driving said second drive shaft by said crankshaft.

6. In a motor vehicle having a pair of front wheels, pair of rear wheels, a driving engine, including a crankshaft and a crankcase, a flywheel for said engine and having a radius larger than the distance between the axis of said crankshaft and the bottom of said crankcase, the axis of said flywheel being disposed above the bottom of said crankcase by a distance equal to at least the radius of said flywheel, means including said flywheel for driving at least one of said pairs of wheels by said crankshaft, the axis of said crankshaft being disposed below the axes of said wheels and the axis of said flywheel, said driving engine being mounted adjacent said front wheels and operatively connected to said rear wheels for driving the same, a gearing aggregate adjacent said rear wheels, a driving shaft connecting said flywheel with said gearing aggregate, said driving shaft being disposed over its whole length below the axis of said wheels.

7. In a motor vehicle having a pair of front wheels, a pair of rear wheels, a driving engine including a crankshaft and a crankcase, a flywheel for said engine and having a radius larger than the distance between the axis of said crankshaft and the bottom of said crankcase, the axis of said flywheel being disposed above the bottom of said crankcase by a distance equal to at least the radius of said flywheel, means including said flywheel, for driving at least one of said pairs of wheels by said crankshaft, the axis of said crankshaft being disposed below the axes of said wheels and the axis of said flywheel, the axis of said flywheel being also disposed below the axis of said wheels and being offset relative to said crankshaft in a transverse direction of said vehicle, further comprising a driver's seat, said driving means comprising a shaft extending from said flywheel to said driven wheels and laterally adjacent said driver's seat, the axis of said shaft extending transversely to and below said wheel axes.

8. In a motor vehicle, the combination as defined in claim 7, wherein said engine is mounted adjacent said front wheels, and wherein the rear wheels are those driven by said driving means, and further comprising a speed transmission mounted behind the axes of said rear wheels.

9. In a motor vehicle, the combination as defined in claim 8 including a vehicle body supporting said engine and said transmission, a differential mounted on said body, means for driving said differential through said transmission, resilient means for suspending said rear wheels on said body and permitting a resilient substantially vertical reciprocation of said wheels relative to said body, transverse cardan shafts extending substantially at the level of said wheel axes and participating in said resilient reciprocation, at least one brake drum mounted on said differential substantially at the level of said wheel axes, said drive shaft connecting said flywheel with said transmission extending below said brake drum.

10. In a motor vehicle having a pair of front wheels, a pair of rear wheels, a driving engine including a crankshaft and a crankcase, a flywheel for said engine and having a radius larger than the distance between the axis of said crankshaft and the bottom of said crankcase, the axis of said flywheel being disposed above the bottom of said crankcase by a distance equal to at least the radius of said flywheel, means including said flywheel for driving at least one of said pair of wheels by said crankshaft, the axis of said crankshaft being disposed below the axes of said wheels and the axis of said flywheel, the axis of said flywheel being also disposed below the axis of said wheels, the axis of said flywheel being offset relative to said crankshaft in a transverse direction of said vehicle.

11. In a motor vehicle having a pair of front wheels, a pair of rear wheels, a driving engine including a crankshaft and a crankcase, a flywheel for said engine and having a radius larger than the distance between the axis of said crankshaft and the bottom of said crankcase, the axis of said flywheel being disposed above the bottom of said crankcase by a distance equal to at least the radius of said flywheel, means including said flywheel for driving at least one of said pair of wheels by said crankshaft, the axis of said crankshaft being disposed below the axes of said wheels and the axis of said flywheel, said driving means comprising a shaft extending parallel to said crankshaft for driving said flywheel on said engine, and means for driving said parallel shaft by said crankshaft, said flywheel being rotatably mounted on said engine at one end thereof, said means for driving said flywheel comprising a pair of gears supported on said end of said engine adjacent said flywheel and intermediate said crankshaft and said parallel shaft.

References Cited in the file of this patent

UNITED STATES PATENTS

| | | |
|---|---|---|
| 798,926 | Schmidt | Sept. 5, 1905 |
| 1,288,022 | Kellogg | Dec. 17, 1918 |
| 1,654,792 | Corona | Jan. 3, 1928 |
| 2,054,877 | Eastman | Sept. 22, 1936 |
| 2,070,758 | Spatz | Feb. 16, 1937 |
| 2,091,652 | Porsche | Aug. 31, 1937 |
| 2,232,154 | Wagner | Feb. 18, 1941 |
| 2,237,369 | Seyerle | Apr. 8, 1941 |

FOREIGN PATENTS

| | | |
|---|---|---|
| 557,004 | France | Apr. 26, 1923 |